United States Patent [19]

Takada

[11] 4,342,483
[45] Aug. 3, 1982

[54] CHILD SAFETY SEAT FOR VEHICLES

[76] Inventor: Juichiro Takada, 3-12-1, Shinmachi Setagayaku, Tokyo, Japan

[21] Appl. No.: 133,468

[22] Filed: Mar. 24, 1980

[51] Int. Cl.³ .......................... A47D 13/08; B60N 1/12
[52] U.S. Cl. .................................... 297/488; 280/751; 297/216; 297/250; 297/267; 297/484
[58] Field of Search ............. 297/488, 487, 484, 485, 297/476, 478, 216, 250, 253, 467; 280/808, 733, 743, 751, 801, 748, 733; 5/466

[56] References Cited

U.S. PATENT DOCUMENTS

| | | | |
|---|---|---|---|
| 3,620,569 | 11/1971 | Mathis | 297/478 |
| 3,910,634 | 10/1975 | Morris | 297/467 |
| 3,912,328 | 10/1975 | Tanaka | 24/196 X |
| 3,934,934 | 1/1976 | Farrell, Jr. | 297/488 |
| 3,938,859 | 2/1976 | Henderson et al. | 297/DIG. 2 |
| 3,941,404 | 3/1976 | Otaequi-Ugarte | 297/488 X |
| 3,948,541 | 4/1976 | Schulman | 280/733 |
| 3,948,556 | 4/1976 | Hyde et al. | 297/488 |
| 4,025,111 | 5/1977 | Tanaka et al. | 297/487 |
| 4,039,363 | 8/1977 | Robertson | 428/71 |
| 4,099,778 | 7/1978 | Lehr | 297/484 |

FOREIGN PATENT DOCUMENTS

| | | | |
|---|---|---|---|
| 2032148 | 1/1972 | Fed. Rep. of Germany | 280/733 |
| 2712917 | 9/1978 | Fed. Rep. of Germany | 297/484 |
| 1187677 | 4/1970 | United Kingdom | 297/467 |
| 1442398 | 7/1976 | United Kingdom | 297/250 |

*Primary Examiner*—James T. McCall
*Attorney, Agent, or Firm*—Brumbaugh, Graves, Donohue & Raymond

[57] ABSTRACT

A child safety seat for vehicles comprises a molded plastic seat having a bottom, back and protective sides and fitted with a padded cover. The plastic seat is carried on and strengthened by a tubular metal frame which is constructed to support the safety seat on a vehicle seat and to be secured in place by the vehicle seat belt or a special restraint belt. A retractor belt leads rearwardly from an emergency locking retractor fastened to the underside of the seat and joins a pair of shoulder belts which extend divergently and upwardly in back of the seat back, forward over an upper cross piece of the supporting frame and through lateral spaced-apart slots in the seat back and then lead downwardly into a polymeric foam abdominal pad. Portions of the shoulder belts corresponding to the pelvic region of the child are embedded within and united to the abdominal pad and are fastened at their lower ends to the upper portion of a buckle tongue, which portion is also embedded within the abdominal pad. The buckle tongue is releasably received in a buckle affixed on the underside of the front of the seat bottom. Provision is made for adjustment of the effective length of each shoulder strap, and additional slots through the back can be provided for alternative fitting of the shoulder belts in different pairs of slots for improved fitting of the belts to small and large children.

7 Claims, 11 Drawing Figures

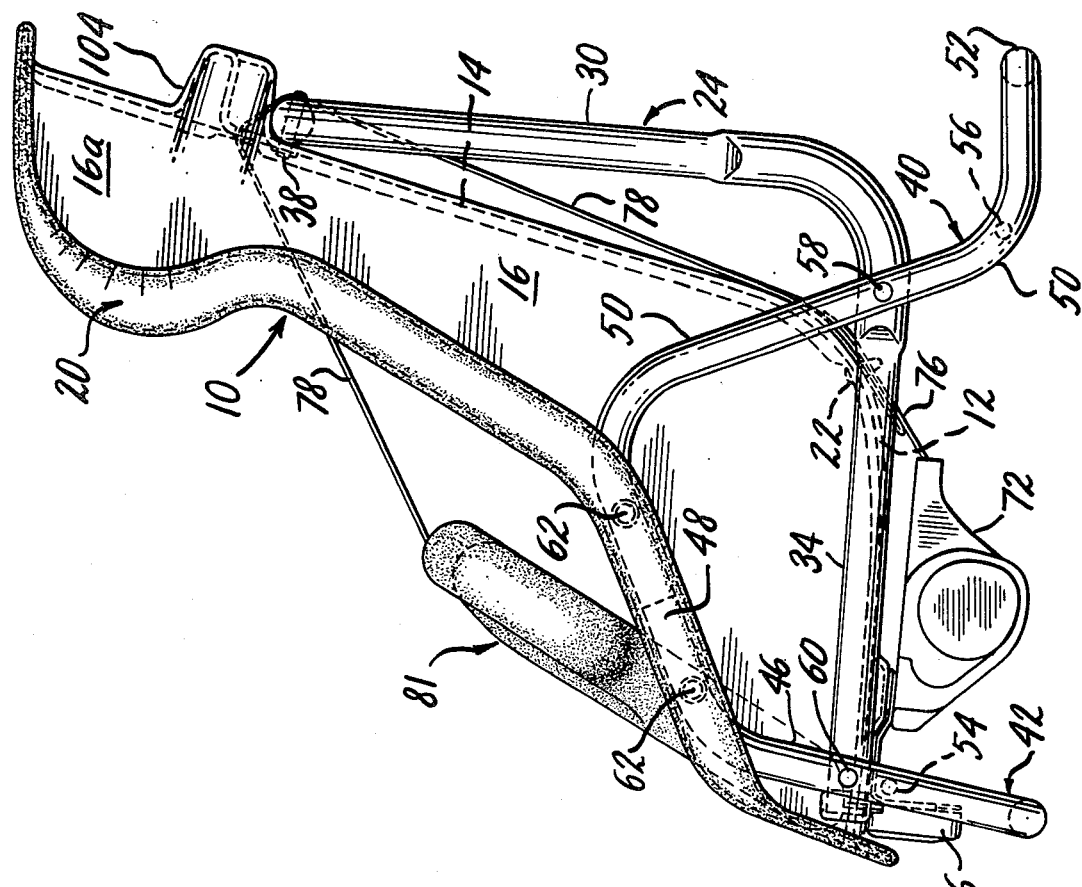
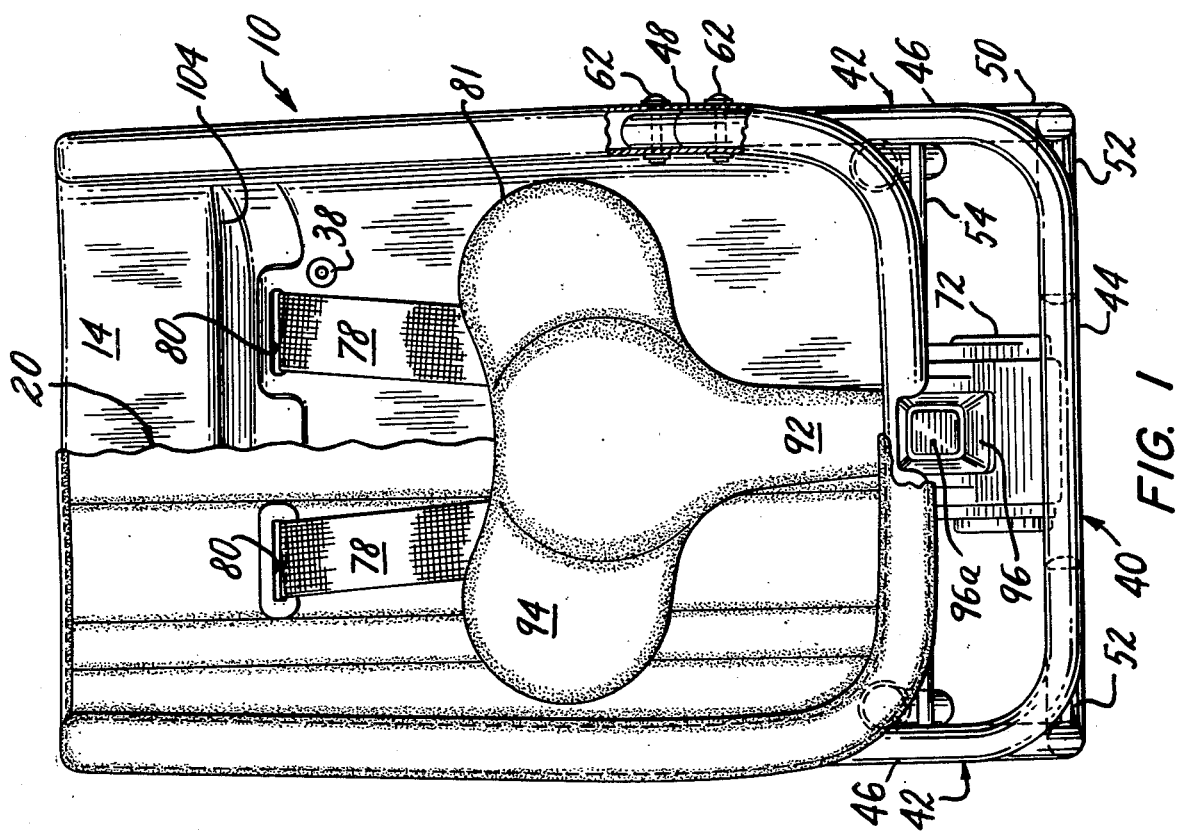
FIG. 1
FIG. 2

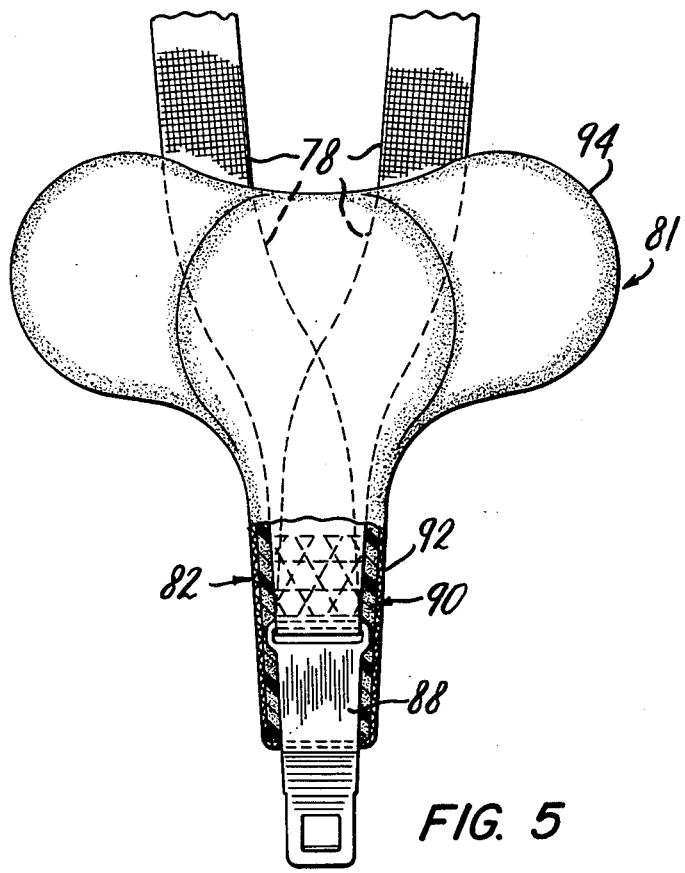
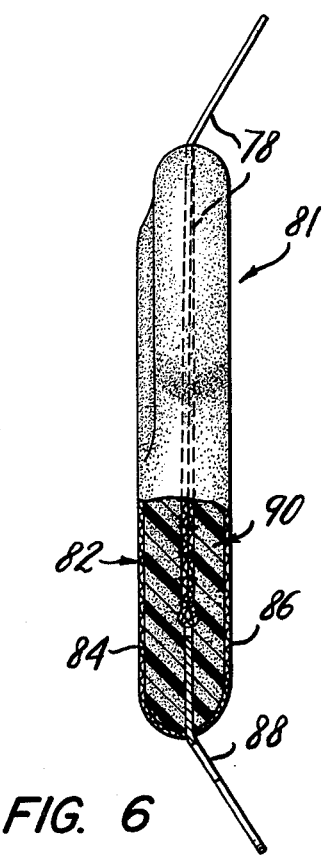
FIG. 5    FIG. 6
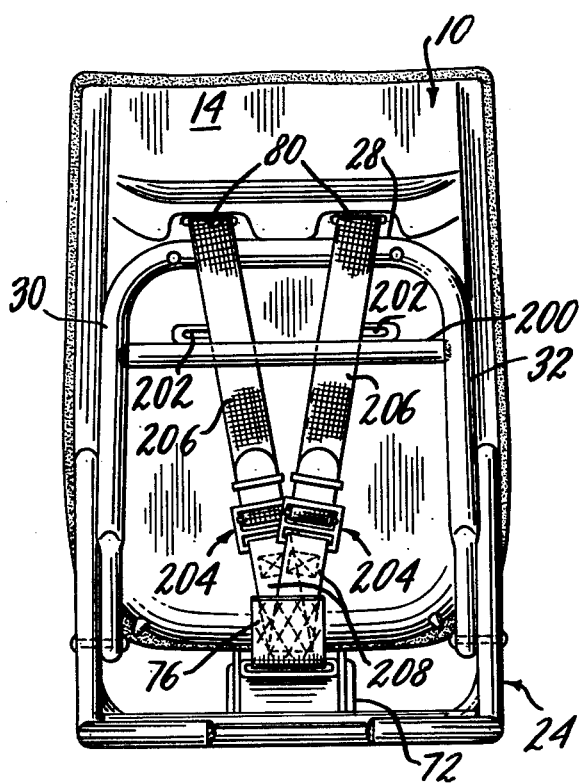
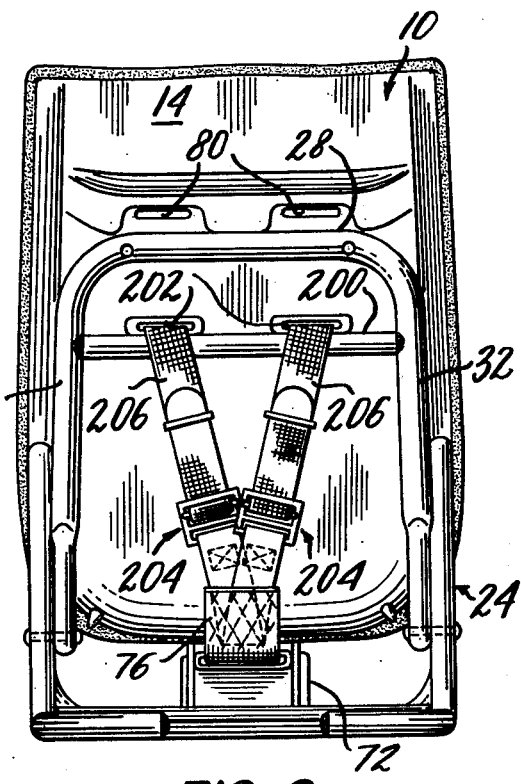
FIG. 7    FIG. 8

CHILD SAFETY SEAT FOR VEHICLES

FIELD OF THE INVENTION

The present invention relates to child safety seats of the type used in vehicles to restrain small children from being thrown from a safely seated position in the event of a collision, upset or other emergency.

BACKGROUND OF THE INVENTION

The occupant restraint belt systems which vehicles are equipped with by the manufacturer are unsuited for use by small children. Accordingly, a variety of special child restraint systems are available and in widespread use. The most common type of child restraint system is a special seat which rests on the vehicle seat and is suitably fastened in place by either the vehicle restraint belt or a special belt. Conventional child safety seats usually consist of a small plastic shell-type seat having a padded cover and fitted with a restraint belt system composed of a pair of shoulder belts, a waist belt and a crotch belt. Because children vary considerably in size as they grow from infancy, the belts are usually adjustable. Many of the known belt systems are relatively complicated because of the number of belt sections involved and the adjustable features incorporated in them. They are also frequently cumbersome to put on the child. The child safety seats described and shown in U.S. Pat. Nos. 3,596,968, 3,606,453, and 3,794,379 are representative.

It has also been previously proposed to include an abdominal pad in the restraint belt system of the child seat. Such a pad enhances the protection of the child by spreading the load over the child's pelvic area. Examples of such systems are described and shown in U.S. Pat. Nos. 3,912,328, 4,025,111 and 4,040,664. Those systems consist of a pair of shoulder straps joined to the abdominal pad by a metal anchor member which in turn joins the shoulder straps to a crotch strap that is fastened to a buckle under the front portion of the seat. Compared to a number of other systems, which are somewhat more complex, the last mentioned systems are comparatively convenient to use, once relatively complicated adjustments have been made so that the system fits the child. On the other hand, the flexible crotch strap and the location of the buckle and buckle tongue are somewhat inconvenient to fasten and unfasten.

The present inventor has heretofore made a desirable improvement in child safety seats, and the seats embodying such improvements have been marketed in Japan for some time. One such improvement is the provision of an emergency locking retractor attached to the underside of the seat and receiving a retractor belt which is joined to a pair of shoulder belts. The provision of a retractor in the restraint belt system of the child seat has the advantages of facilitating the proper fitting of the belt to children of various sizes without requiring adjustment—the belt automatically adjusts in length—and of being more comfortable to the child by allowing him or her to move about in the seat, particularly to lean forward. Nonetheless, the belt system is highly effective in an emergency because the retractor automatically locks when the belt is rapidly accelerated.

SUMMARY OF THE INVENTION

The present invention provides further improvements in child safety seats of the general type described above. Like conventional child safety seats, a seat embodying the present invention includes a padded contoured seat having a bottom, a back and sides and is constructed to rest on a vehicle seat. The sides prevent the child for being thrown sideways by restraining the head and shoulders of the child and thereby supplement the belt system in protecting the child in an emergency. Preferably, the seat is mounted on a strong frame made of metal tubing. The seat is equipped with a restraint belt system which includes an emergency locking retractor affixed to the underside of the seat. The retractor maintains constant tension in the belt-winding direction on a retractor belt but allows the belt to unwind relatively freely except when it locks in response to a predetermined acceleration of the retractor belt in the unwinding direction. The end of the retractor belt is secured to a pair of shoulder straps which lead obliquely up the back of the seat and pass through slots in the back of the seat at a suitable height so that they lead down over the shoulders of the child.

One aspect of the improved child safety seat, according to the present invention, is an abdominal pad of polymeric foam which is united to the belt system by means of embedding the portions of the shoulder belts in the pelvic region and a portion of a buckle tongue within the foam material of the abdominal pad. In particular, portions of the shoulder straps adjacent the abdomen of the seat occupant and a portion of the buckle tongue to which the shoulder straps are joined in a location corresponding to the crotch of the child are embedded within and united to a polymeric foam abdominal pad. In addition to cushioning and spreading the strap loads over the occupant's abdomen, the pad retains the parts of the strap above the abdomen in laterally spaced apart relation. The lower parts of the shoulder straps within the abdominal pad are affixed in position within the foam material itself and converge downwardly to the upper end of the buckle tongue. The buckle tongue fits into a buckle fastened under the front part of the seat. The abdominal pad preferably has a cover of durable sheet material, such as a plastic leatherette, which imparts stiffness to the pad, and the foam itself is comparatively stiff. The composite stiffness considerably facilitates applying the belt to the child because the person applying it can grasp the upper portion of the pad and guide the tongue into the buckle much more conveniently than presently known crotch straps which require the person applying the belt to the child to grasp the upper portion of the buckle tongue in order to secure the tongue to the buckle.

Although the pad can be made by joining two pieces of foam material to each other and to the belt by an adhesive and thereafter fitting a cover, a further aspect of the invention involves the formation of the foam in situ within the cover with the strap portions and tongue portion in place within the cover.

Among the desirable characteristics of a preferred embodiment of the present invention are the following:

(1) The abdominal pad is generally "T" shaped in that it includes a relatively narrow lower portion which is received between the seat occupant's legs and a relatively wider upper portion that extends across the occupant's abdomen.

(2) The cover consists of a front panel and a rear panel stitched to each other around their perimeters to define a cavity between the two panels, and the shoulder straps are bound in the stitching at laterally spaced apart locations along the top edge of the cover.

(3) The shoulder straps pass through the seat back and include portions that extend downwardly behind the seat back. The seat is fastened to a rigid frame which includes a frame member adjacent the locations from which the straps extend through the seat backs so that the frame carries at least part of the strap loads in an emergency situation.

(4) There are at least two pairs of slots in the back, each pair being at a different height from any other pair, so that straps can be adjusted to suit the size of the seat occupant by passing them through a selected pair of slots.

(5) The length of belt that can be wound and unwound from the emergency locking retractor should be relatively short so that the child cannot remove the belt by loosening it and then climb out of the seat. Accordingly, for adjustment of the belt system to fit children of various sizes, say from age 7 months to 4 years, an adjustable detachable buckle is fitted on each shoulder strap, preferably adjacent the retractor belt, so that each strap can be detached from the retractor belt and the effective length of each strap can be altered. This feature, in conjunction with multiple pairs of slots in the back, ensures proper fitting of the belt system to children of various sizes.

In addition to the advantages already mentioned of allowing the child to move freely and yet protecting the child in an emergency and the ease of fastening and unfastening the belt system from the buckle, the abdominal pad, particularly insofar as it includes a portion that extends down between the child's legs, provides good protection for the pelvic region of the child, particularly the crotch. The lower portion of the abdominal pad is more comfortable to the child and safer as well, as compared to a crotch strap which can rub on the inside of the child's thighs and which can be abrasive to the legs and crotch in an emergency and cause injury to the skin and flesh. The above-described adjustment features are convenient to use and increase the versatility of the seat so that it can be used for children of a wide range of sizes. The affixation of the lower ends of the shoulder belts to the abdominal pad ensures good fit of the shoulder belts to the occupant and maintains the lateral separation between them without the metal anchor and other relatively complicated components of previously known abdominal pads.

For a better understanding of the invention, reference may be made to the following description of exemplary embodiments taken in conjunction with the figures of the accompanying drawings.

DESCRIPTION OF THE DRAWINGS

FIG. 1 is a front elevational view of a child safety seat embodying the present invention;

FIG. 2 is a side elevational view of the seat shown in FIG. 1;

FIG. 5 is a fragmentary front elevational view of the abdominal pad with the lower portion broken out in cross section;

FIG. 6 is a side elevational view of the abdominal pad with the lower portion broken out in cross section;

FIG. 7 is a rear elevational view of another embodiment of the invention;

FIG. 8 is also a rear elevational view of the embodiment shown in FIG. 7, but shows the belt system adjusted to fit a small child;

DESCRIPTION OF THE EXEMPLARY EMBODIMENTS

Figures 3, 4:
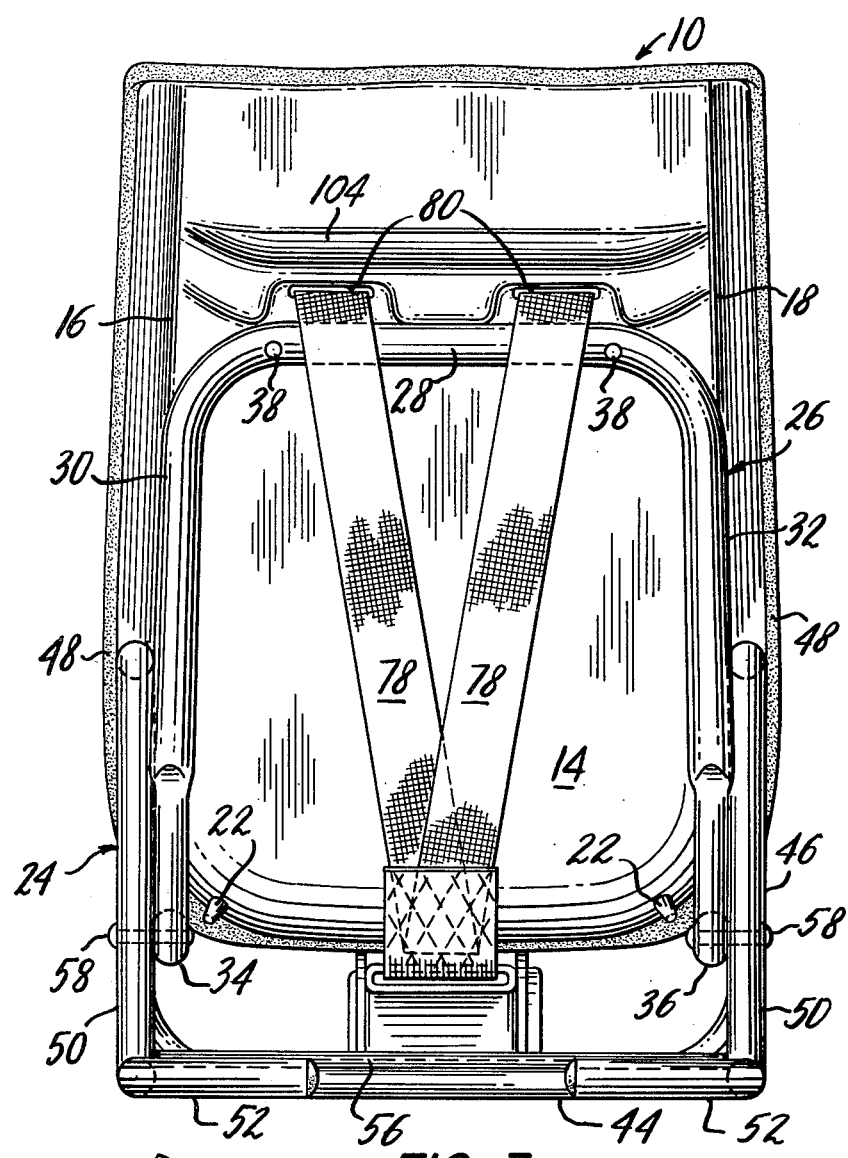
FIG. 3 is a rear view of the seat shown in FIGS. 1 and 2.
FIG. 4 is a fragmentary side view in cross section taken along the front portion of the seat bottom of the seat shown in FIGS. 1 to 3.

The child seat shown in FIGS. 1 to 3 comprises a molded plastic seat 10 having a bottom 12, a back 14 and a pair of sides 16 and 18. The upper portion of each of the sides 16 and 18 has a forwardly extending projection 16A, for protection of the head of the occupant, and both sides 16 and 18 are shaped in profile to lie laterally adjacent the shoulders, arms and hips of the child to restrain him laterally and supplement the restraint belt system of the seat (which is described in detail below). The seat 10 is fitted with a padded cover 20, the perimeter of which is pocketed to receive peripheral flanges of the seat 10. Removable snap type buttons 22 fasten the lower rear portions of the cover 20 to the seat 10.

The seat 10 is affixed to a frame 24 which includes a one piece bottom and back frame member 26 consisting of an upper back portion 28, a pair of generally vertical side portions 30 and 32, each of which curves downwardly from the upper back portion 28, and a pair of generally parallel horizontal bottom portions 34 and 36 which curve forwardly from the lower ends of the respective side portions and along the sides of the seat bottom 12. The back 14 of the seat 10 is fastened to the upper back portion 28 of the frame member 26 by rivets 38. The other member 40 of the frame is assembled from three pieces. First, there is a generally U-shaped front piece 42 having a horizontal transverse portion 44 located generally under the front of the seat and a pair of generally vertical side leg portions 46, the upper ends of which curve rearwardly and extend under a flange 48 along the front edges of the respective side portions 16 and 18 of the seat 10. The rearward upper end of each side leg portion abuts the forward end of respective second and third pieces, rear leg members 50 which are generally z-shaped when viewed from the side and have a turned-in rearward end portion 52. The rear leg pieces 50 are, preferably, welded to the front piece 42, but other modes of connection can also be used. A front cross bar 54 located under the front of the seat is welded to the front leg portions 46 of the frame piece 42, and a rear cross bar 56 is welded to the rear leg members 50. The frame members 26 and 40 are connected to each other where they cross at each side by rivets 58 and 60. The sides 16 and 18 of the seat 10 are fastened to the frame member 40 by rivets 62.

The restraint belt system of the child safety seat shown in FIGS. 1 to 3 includes an emergency locking retractor 70 which is housed in a casing 72 and is fastened under the seat bottom 12 by a nut and bolt 74 (see FIG. 4). The retractor is, preferably, of the type which locks in response to a predetermined acceleration of the retractor belt 76 that is wound onto it. The belt is continuously kept under tension by a winding spring but is otherwise free to be pulled from the retractor except when it locks. The retractor 70 can also be of the type which responds to an inertia sensitive device which detects a predetermined acceleration of the vehicle in any direction. Emergency locking retractors have the advantage of permitting the person who is restrained by the belt to move relatively freely except when the retractor is locked in an emergency.

The relationship between the length of the retractor belt and the lengths of the shoulder belts are such that only a short length of the retractor belt 76 can be unwound from the retractor 70 so that the child sitting in the seat, though he or she can lean forward on the seat, is not apt to get out of the belt by loosening it too far by pulling it off the retractor.

The retractor belt 76 leads from the retractor 70 a short distance rearwardly and upwardly to the rear portion of the seat and is sewn to one end of each of a pair of shoulder belts 78. Each shoulder belt 78 extends upwardly along the back of the seat and then turns forward and passes through one of a pair of transversely spaced-apart slots 80 located at a suitable height along the back 14 of the seat for proper fitting of the shoulder belts 78 to the seat occupant. Each belt 78 then extends downwardly, forwardly and slightly inwardly to an abdominal pad 81. As shown in FIGS. 5 and 6, and as particularly apparent from the broken-away portions of those figures, the abdominal pad 81 comprises an outer cover 82 made from a front panel 84 and a rear panel 86 sewn together around the perimeter. The shoulder belts 78 are bound into the stitching at transversely-spaced locations along the upper edge of the cover. Portions of the shoulder belts extend convergently down within the cavity defined between the panels 84 and 86 of the cover 82 and are joined at the lower end of the pad to a buckle tongue 88, the upper portion of which extends up into the lower end of the cavity. The cavity within the cover 82 is filled with a polymeric foam, such as thermally-blown polyurethene. The pad 81 is made by sewing the cover 82 with the belt portions and buckle portion inserted into it, and charging the cavity with the uncured polymeric material which is then thermally blown in situ. Accordingly, the belt portions and the buckle tongue portion that are located within the cavity are imbedded within and united to the polymeric foam mass 90 contained within the cover 82. The polymeric foam is sufficiently soft and compressible to provide a cushioning and load-spreading effect against the body of the child to which the belt system is fitted. On the other hand, the composite structure of the pad 81 is such as to render it quite stiff, partly because of the relative non-extensibility of the covering and the sandwich effect of uniting the covering with the foam material within it and partly because of the inherent relative stiffness of the foam. The stiffness of the pad 80 also maintains a desired separation between the lower ends of the shoulder belt 78 at the points where they enter the pad and are stitched to the cover. The abdominal pad is generally T-shaped as viewed from the front and includes a narrow, elongated generally vertical lower portion 92 that fits between the legs of the child sitting in the seat and a comparatively wide top portion 94 which extends across the abdomen of the child.

The lower end of the buckle tongue 88 is releasably received within a buckle 96 which is fastened to a bracket 98 affixed by a nut and bolt 100 to the underside of the front portion of the seat 10. A portion of the bracket is also fastened to the base of the retractor 70 by the nut and bolt 74, thereby enhancing the strength of the belt system. The buckle tongue enters the buckle 96 through a slot 102 in the bottom portion 12 of the seat 10. The releasing button 96a of the buckle 96 is located under the seat in a location where it is very unlikely that a child could reach down and release the buckle. Nonetheless, it is conveniently accessible to the person who places the child in the seat and does up the belt system. The upper portion of the buckle tongue (the part which is received within the lower portion 92 of the abdominal pad 80) is bent rearwardly so that when the buckle tongue is locked in the buckle 96, the abdominal pad 81 lies obliquely to the seat bottom 12 in a position favorable for comfortable and safe fitting of the upper portion 94 to the abdomen of the child. The lower portion 92 of the pad 80 is sufficiently flexible to allow the pad to bend slightly forward when the child leans forward, and there is also some play between the buckle tongue and the buckle mechanism which affords pivoting of the pad forward and backward so that the child is relatively free to move in the seat and yet is somewhat retrained against moving forward and in any event is held in the seat for restraint upon locking of the retractor in an emergency.

It will be observed, especially from FIG. 2, that the shoulder belts 78 pass over the transverse top portion 28 of the frame member 26. Accordingly, when the belts 78 are under relatively high tension in an emergency, the frame carries a large part of the load that would otherwise be imposed upon the back of the plastic seat 10. Accordingly, the seat need not be as strongly constructed as it would have to be in order to carry the entire load in an emergency. The upper back portion of the seat 10 has molded into it a transverse box-like stiffener portion 104 which strengthens the region of the back 14 of the seat 10 around the slots 80 through which the belt passes.

An important advantage of the child seat and the components thereof described above and shown in FIGS. 1–6 is the ease of hooking up the restraint belt. When the child is buckled into the seat, the person who releases him or her can conveniently grasp any part of the abdominal pad 81; usually, it is most convenient to grasp some part of the upper portion 94 rather than reaching down between the child's legs and grasping the lower portion. The person then pushes on the release button 96a of the buckle 96 and lifts up on the abdominal pad, and once the buckle tongue 88 is moved just a slight distance up to release the locking pin from the receiving hole in the buckle tongue, the hand used to release the buckle is available for use, if necessary, in repositioning or otherwise tending to the child. It is then very easy to swing the abdominal pad 81 up over the child's head and lay it over the back of the seat or onto the back of the vehicle seat, thereby completely freeing the child from restraint by the belt system. A young child can then easily be lifted out of the seat, and an older child can get out of the seat himself. When the child is put into an empty seat, the process is reversed. The user need only grasp some part of the abdominal pad and with only one hand, because of the relative stiffness of the abdominal pad, can easily guide the buckle tongue 88 through the slot 102 in the seat and push it down to lock it to the buckle 96. Meanwhile, the shoulder straps will easily follow the pad over the child's head and become properly positioned over his shoulders. The retractor 70 readily permits the desired lengths of shoulder belts to be pulled out to facilitate positioning of the shoulder straps 78 and reception of the buckle 88 in the buckle 96. Once the child is installed and buckled into the seat, the retractor allows the belts to pull out when the child leans forward, but in an emergency the retractor 70 will lock in response to rapid acceleration of the retractor belt 76 and prevent the shoulder belts 78 and the pad 81 from being pushed forward, thereby restraining the infant. The abdominal pad spreads the load of the child's body when it is thrown forward in an emergency over his abdomen and cushions the child against injury. The laterally-extending portions of the upper part 94 of the abdominal pad, acting in conjunction with the shoulder belt, keep the child from being thrown upwardly by engaging the tops of his thighs and holding him down.

Figure 9:
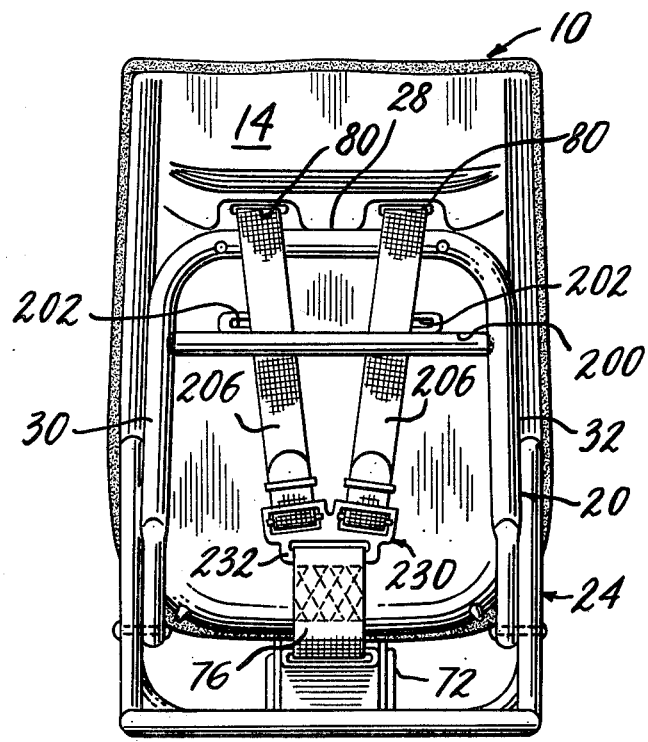
FIG. 9 is a rear elevational view of a third embodiment.

FIGS. 7 through 9 of the drawings show two variations of a child seat that is similar in most respects to the one shown in FIGS. 1 through 6, but which includes provision in the restraint belt system for adjustment of the lengths, and positions of the shoulder belts for better fitting to very small children and relatively large children. The seat and frame of the two embodiments are almost identical to those of the embodiment of FIGS. 1 through 6. The only differences are the addition of a tubular crosspiece 200 welded to the side portions 30 and 32 of the frame member 24 a short distance below the upper portion 28 and the provision of another pair of shoulder belt slots 202 adjacent the bar 200 and some distance below the slots 80.

Figure 10:
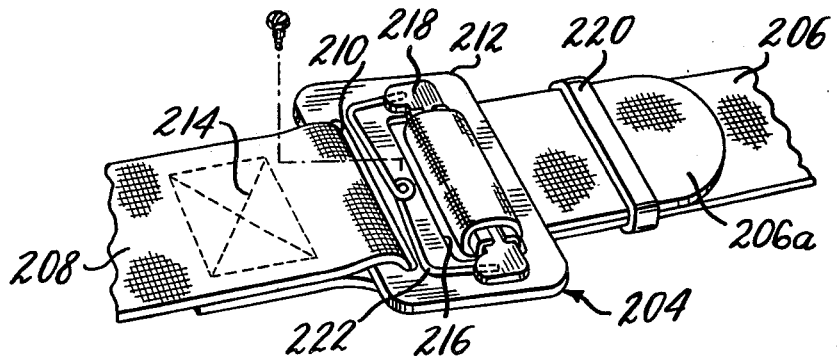
FIG. 10 is a pictorial view of an adjustable, releasable buckle useful in the embodiments of FIGS. 7 to 9.
Figure 11:
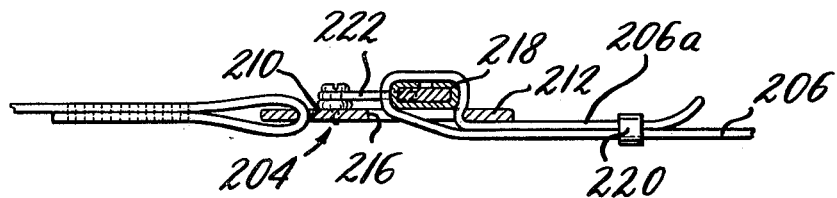
FIG. 11 is a edge view of the buckle of FIG. 10 showing portions of the components in cross section.

Both embodiments, (that of FIGS. 7 and 8 and that of FIG. 9) also include a modified belt system, the modification involving the addition of an adjustable and detachable buckle in each shoulder strap. In the form shown in FIGS. 7 and 8, there is a separate buckle 204 in each shoulder strap 206. Two short pieces 208 of belt material are stitched to the end of the retractor belt 76 and, as shown in detail in FIGS. 10 and 11, the end of each piece is inserted through a connection slot 210 in a buckle frame 212, folded back on itself a short distance and then stitched by stitching 214. The lower back end of each shoulder belt 206 is passed outwardly through a locking slot 216 in the buckle frame, passes around a lock bar 218, passes back down through the locking slot 216 and leads back on the incoming portion of the belt 206 through a retainer ring 220 which keeps the incoming and outgoing sections of the belt against each other. The lock bar 218 is urged by a spring 222 affixed to the frame in a direction to clamp the outgoing segment 206a of the end of the belt 206 against the edge of the locking slot 216. When each shoulder strap 206 is pulled on, such as in an emergency, the belt force is transmitted to the locking bar 218 and clamps it more tightly against the buckle frame 212 with a force proportional to the tension on the belt. Accordingly, the buckle securely locks the belt 206 to an adjusted length. The length of the belt is adjusted by pushing the lock bar 218 in a direction opposite that of the force of the spring 222 and taking up or paying out the desired amount of shoulder belt 206. Such adjustment need be made only occasionally as a particular child who uses the chair grows.

When the child who uses the seat is very small, the belts 206 are installed, as shown in FIG. 8, through the lower pair of slots 202 in the back of the seat 10, and the belts are shorted accordingly by means of the respective buckles 204. As shown in FIG. 8, each shoulder belt 206 passes over the cross bar 200 of the frame, which carries the major portion of the belt loads. For a larger child, the belts 206 are installed, as shown in FIG. 7, through the upper slots 80 in the seat 10, again, with suitable adjustment of the belt lengths by means of the respective buckles 204.

The embodiment of FIG. 9 is the same in all respects as the embodiment of FIGS. 7 and 8 except for the substitution for the belt pieces 208 and separate buckles 204 of a single tandem buckle 230 having a frame 232 that is attached directly to the retractor belt 76. The frame 232 of the buckle 230 has a pair of locking slots, spring-loaded locking bars and retainer rings that correspond in all respects to the buckle components shown in FIGS. 10 and 11 and described above.

There is, therefore, provided, in accordance with the present invention, an improved child safety seat characterized by various aspects of construction that contribute to safe restraint of the child by means of a belt system which allows the child some freedom of movement and yet responds to emergency situations by automatic locking of a highly effective belt system coupled to an abdominal pad of unique construction. The seat is easy to use and is well suited to the inclusion of adjustable features that allow it to be used for several years of the child's early period of growth, say from about 7 months to about 4 years of age.

The above-described embodiments are intended to be merely exemplary, and numerous variations and modifications of them will be apparent to those skilled in the art without departing from the spirit and scope of the invention. All such variations and modifications are intended to be included within the scope of the invention, as defined in the appended claims.

I claim:

1. A child safety seat for vehicles having a seat bottom, a seat back, a pair of shoulder restraint belts leading from laterally spaced-apart locations on the seat back above the locations of the shoulders of a seat occupant to a buckle tongue, and a buckle affixed to the front center portion of the seat bottom for receiving the tongue, characterized in that portions of the shoulder belts adapted to be disposed adjacent the abdomen of the seat occupant and a portion of the buckle tongue are embedded within and united to a generally T-shaped polymeric foam abdominal pad encased within a cover of durable sheet material wherein the foam pad is formed in situ within the cover with the belt portions and the tongue portion pre-installed within the cover prior to forming the foam, and including a relatively narrow lower portion adapted to be received between the occupant's legs and a relatively wider upper portion adapted to extend across the occupant's abdomen, the pad being adapted to cushion and protect the occupant's crotch and to cushion and spread belt loads over the occupant's abdomen, and which retains the parts of belts above the abdominal pad in laterally spaced-apart relation.

2. A child safety seat according to claims 1 or 3 and further characterized in that the cover consists of a front panel and a rear panel stitched to each other around their perimeters to define a cavity between them and wherein the shoulder belts are secured by the stitching at laterally spaced-apart locations along the top edge of the cover.

3. A child safety seat according to claim 1 and further characterized in that the shoulder belts pass through slots in the seat back and include portions extending downwardly behind the seat back which are joined to a retractor belt, and further characterized in that there is an emergency locking retractor affixed under the seat bottom from which the retractor belt extends and by which the shoulder belts are yieldably held under tension.

4. A child safety seat according to claim 3 and further characterized in that the retractor is of the type which normally allows the belt to be withdrawn freely against the rewinding force of a spring but which locks automatically in the event of acceleration of the seat occupant.

5. A child safety seat according to claim 1 which further includes a rigid frame carrying the seat bottom and back and further characterized in that portions of a frame member adjacent said seat back locations from which the shoulder belts extend are engaged by the belts and carry at least part of the belt loads.

6. A child safety seat according to claims 1 or 5 in which the said seat back locations are defined by slots in the seat back through which the straps pass and further characterized in that there are at least two pairs of such slots, each pair being at a different height from any other pair for adjustment of the belts to match the size of the seat occupant by passing the straps through a selected pair of slots.

7. A child safety seat according to claim 3 or 4 in which the seat back locations are defined by slots in the back through which the straps pass and further characterized in that there are at least two pairs of such slots, each pair being at a different height from any other pair for adjustment of the belts to match the size of the seat occupant by passing the belts through a selected pair of slots, and in that there is an adjustable and detachable buckle in a portion of each generally adjacent the retractor belt so that each belt can be detached from the retractor belt and the effective length of belt can be altered.

* * * * *